United States Patent
Cubilier et al.

(10) Patent No.: US 12,453,434 B2
(45) Date of Patent: Oct. 28, 2025

(54) PARCEL LOCKER BANK SYSTEM WITH IMPROVED AUTONOMOUS CLUSTERS OF COMPARTMENTS

(71) Applicant: QUADIENT TECHNOLOGIES FRANCE, Bagneux (FR)

(72) Inventors: Christophe Cubilier, Le Kremlin Bicetre (FR); Arnaud Yvoz, Taillades (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 86 days.

(21) Appl. No.: 18/383,561

(22) Filed: Oct. 25, 2023

(65) Prior Publication Data

US 2024/0130552 A1   Apr. 25, 2024
US 2024/0225335 A9   Jul. 11, 2024

(30) Foreign Application Priority Data

Oct. 25, 2022 (EP) .................................. 22306614

(51) Int. Cl.
   *A47G 29/14* (2006.01)
   *G07C 9/00* (2020.01)

(52) U.S. Cl.
   CPC ....... *A47G 29/141* (2013.01); *G07C 9/00174* (2013.01); *G07C 2009/00769* (2013.01)

(58) Field of Classification Search
   None
   See application file for complete search history.

(56) References Cited

U.S. PATENT DOCUMENTS

| 9,430,892 B2 * | 8/2016 | Amdahl | G07C 9/00571 |
| 10,096,183 B2 * | 10/2018 | Nitu | G07C 9/00912 |

(Continued)

FOREIGN PATENT DOCUMENTS

| EP | 1585078 B1 * | 10/2008 | G08B 21/028 |
| EP | 3 671 666 A1 | 6/2020 | |

(Continued)

OTHER PUBLICATIONS

Extended European Search Report for EP Application No. 22306614.3, dated Apr. 11, 2023.

*Primary Examiner* — K. Wong
(74) *Attorney, Agent, or Firm* — Cozen O'Connor (57) ABSTRACT

A locker system for parcel deposit and pick-up, comprising a parcel locker bank constituted of at least one autonomous compartments cluster including at least one compartment equipped with a door and including a locking module, which electronically controls locking and unlocking of the door, and a mobile device configured to establish a local communication with the locking module via a short-distance communication, wherein the locking module comprises: an energy management module configured for managing transitions of energy states and allowing the at least one autonomous compartments cluster to be run in a very low energy state or in a low energy state and regularly allowing a partial wake-up from the very low energy state to the low energy state, a broadcasting timer for triggering a transition from a very low energy state to a low energy state, a radio transceiver module equipped with an antenna, and at least one processor running a firmware configured for, while in the very low energy state or in the low energy state, regularly emitting with the radio transceiver module a broadcasted short message towards the at least one mobile device characterized in that the locking module is configured for switching from a slow sleep mode associated with a slow (Continued)

repetition time period to a sleep mode associated with a repetition time period, which is shorter than the slow repetition time period.

18 Claims, 4 Drawing Sheets

(56) References Cited

U.S. PATENT DOCUMENTS

| | | | |
|---|---|---|---|
| 10,679,457 B1* | 6/2020 | Wu | G06F 21/31 |
| 11,375,839 B2* | 7/2022 | Santangeli | G07C 9/00571 |
| 11,423,724 B2* | 8/2022 | Gomez Santamaria | |
| | | | G07C 9/00896 |
| 11,790,709 B2* | 10/2023 | Jiang | H04W 4/12 |
| | | | 340/5.61 |
| 11,995,943 B2* | 5/2024 | Schmidt | G07C 9/00896 |
| 12,205,074 B2* | 1/2025 | Rahilly | G06Q 20/3274 |
| 12,247,431 B2* | 3/2025 | Lessard | E05F 15/63 |
| 2020/0312066 A1 | 10/2020 | Mondrow et al. | |

FOREIGN PATENT DOCUMENTS

| | | | | |
|---|---|---|---|---|
| EP | 4006851 A1 * | 6/2022 | | E05B 47/0012 |
| EP | 4074225 A1 * | 10/2022 | | A47G 29/141 |
| WO | WO-2024240637 A1 * | 11/2024 | | A47G 29/141 |

* cited by examiner

PARCEL LOCKER BANK SYSTEM WITH IMPROVED AUTONOMOUS CLUSTERS OF COMPARTMENTS

FIELD OF THE INVENTION

The embodiments of the present invention relates to a system and methods for depositing shipments by a delivery agent into electronic parcel locker banks and for picking-up these shipments thereafter from the parcel locker banks constituted of autonomous lockable compartments, which require optimizing the energy consumption for their operation.

PRIOR ART—BACKGROUND

Electronic parcel locker bank systems are used for dropping-off, storing and picking up various kinds of shipments such as parcels or packages. These parcel locker bank systems are used by carrier agents for depositing shipments, which are then picked-up from the parcel locker banks by recipients, or may eventually be collected by a carrier agent for freeing the parcel locker banks for other shipments, if the shipments are not picked up in due time by the recipients. A typical architecture for electronic parcel locker bank systems generally comprises a network of parcel locker banks, all communicating directly with a remote shipping system in charge of managing the network of parcel locker banks, and of also managing data exchanges with the carrier information systems. Communication between each parcel locker bank and the remote shipping system is performed by long-distance communication technologies such as 3G-4G or GSM. Such electronic parcel locker bank systems have several issues, including the necessity for an electrical power connection and the need for costly long-distance communication, which does not operate everywhere.

A new generation of parcel locker banks constituted of smart autonomous compartments, and allowing for cost reduction and more flexibility, including in particular compartments swaps, has been described in patent application EP3671665, or in the patent applications EP3671666 or EP3671667 for smart autonomous compartments clusters. These smart autonomous compartments can communicate with and be operated by mobiles devices such as smartphones typically used by shipment recipients or personal digital assistant (PDA) typically used by carrier agents or owners of sites, where the parcel locker banks are installed. Such smart autonomous compartments clusters operate without any electrical power connection and rely only on replaceable electrical batteries. Because of the cost for carrying out a replacement of batteries on site and the associated disturbance, it is most desirable to ensure that the batteries of operating autonomous compartments clusters last as long as possible. On the other hand, to minimize the cost pressure for operating such equipment, standard widely used batteries must be used such as alkaline or lithium batteries. Therefore, there is a need for optimizing the operation and arrangements of smart autonomous compartments clusters to prolong the operating lifetime of the batteries powering these smart autonomous compartments clusters.

Object and Definition of the Embodiments of the Invention

Disclosed are arrangements, which seek to allow for scanning locking modules of parcel locker banks with autonomous lockable compartments and for establishing communication sessions quickly enough as to not negatively impact user experience, and which seek to substantially overcome or ameliorate at least one or more of the above disadvantages. This object is achieved by providing a locker system for parcel deposit and pick-up, comprising: a parcel locker bank constituted of at least one autonomous compartments cluster including at least one compartment equipped with a door and including a locking module, which electronically controls locking and unlocking of the door, and a mobile device configured to establish a local communication with the locking module via a short-distance communication, wherein the locking module comprises: an energy management module configured for managing transitions of energy states and allowing the at least one autonomous compartments cluster to be run in a very low energy state or in a low energy state and regularly allowing a partial wake-up from the very low energy state to the low energy state, wherein in said very low energy state said locking module cannot communicate with said mobile device and said locking module cannot be wakened up by said mobile device, a broadcasting timer for triggering a transition from a very low energy state to a low energy state, a radio transceiver module equipped with an antenna, and at least one processor running a firmware configured for, while in the very low energy state or in the low energy state, regularly emitting with the radio transceiver module a broadcasted short message towards the at least one mobile device characterized in that the locking module is configured for switching from a slow sleep mode associated with a slow repetition time period to a sleep mode associated with a repetition time period, which is shorter than the slow repetition time period. The broadcasting timer regularly triggering a transition from the very low energy state to the low energy state allows for a partial wake-up according to the slow repetition time period when in slow sleep mode or according to the repetition time period when in sleep mode. The slow sleep mode allows for further limiting energy consumption compared to the sleep mode, and the switch from the slow sleep mode to the sleep mode allows for quicker exchanges between the locking module and the mobile device.

In a preferred embodiment, the mobile device is configured to send an active scan message when capturing the broadcasted short message and the switching from a slow sleep mode to a sleep mode is a response to the active scan message, wherein the active scan message is a quick response informing the locking module that the mobile device is actively scanning. An advantage of at least one embodiment of the invention is that any mobile device, whose short-distance communication and scan mode are activated, can trigger the switching from slow sleep mode to sleep mode of the locking module when the mobile device is moved next to the parcel locker bank. Users of the parcel locker bank can then benefit from such a triggering occurring before they arrive for using the parcel locker bank as the locking module being in sleep mode rather than slow sleep mode allows for faster scans and exchanges of their mobile device with the locking module. Following on the switching from the slow sleep mode to the sleep mode, the locking module may perform an access authorization process based on user credentials provided by the mobile device. After a successful access authorization process, a communication session with the mobile device may be established. However, the switching from the slow sleep mode to the sleep mode occurs before an access authorization process and before the locking module establishing a communication session with a mobile device. This switching does not need an access authorization process or the establishment of a communication session to occur.

According to a feature of at least one embodiment of the invention, the locking module further comprises a non-volatile memory storing a unique cluster identification for identifying the compartments cluster, and broadcasting and sleep mode parameters, used for the locking module to communicate with mobile devices and manage sleep modes to minimize energy consumption, and including the slow repetition time period, the repetition time period and a slow sleep return delay.

In another embodiment, the locking module is configured for replacing the slow repetition time period used by the broadcasting timer with the repetition time period copied from the non-volatile memory and for transitioning back in the low energy state and for operating in the sleep mode with the broadcasting timer using the repetition time period for allowing the switching from a slow sleep mode to a sleep mode. Once in sleep mode, the locking module is able to exchange more quickly with the mobile device providing a better user experience than in slow sleep mode.

According to another feature of at least one embodiment of the invention, the locking module comprises a slow sleep timer for switching from the sleep mode back to the slow sleep mode and therefore limiting the energy consumption associated with the sleep mode, and the slow sleep timer is configured for running while the locking module is in the very low energy state for a duration defined by a slow sleep return delay stored in the non-volatile memory. Once the slow sleep return delay is reached, the locking module switches back from the sleep mode to the slow sleep mode. Then the locking module remains in the lower energy consumption slow sleep mode as long as it does not receive an active scan message.

Preferably, the slow sleep return delay corresponds to a maximum time needed for a carrier agent to collect shipments from and deposit shipments into the parcel locker bank so that the locking module does not return to the slow sleep mode before the carrier agent has finished interacting with the parcel locker bank.

Advantageously, the broadcasted short message includes a copy of the unique cluster identification, and in that the mobile device is configured to specifically address the active scan message to the locker module based on the copy of the unique cluster identification. When receiving the active scan message, the locking module triggers a temporary full wake-up switching into full operation mode and allowing to switch from the slow sleep mode to the sleep mode.

According to a feature of at least one embodiment of the invention, the at least one processor comprises a high energy processor module configured to be de-activated in the low energy state, and a low energy processor module configured to be de-activated in the very low energy state and configured to control the radio transceiver module for sending the broadcasted short message and waiting for a response from the mobile device, and a very low energy processor module configured for minimal control.

According to another feature of at least one embodiment of the invention, the locker system further comprises a long-distance communication network and a remote shipping system configured to communicate with the mobile device via the long-distance communication network wherein the remote shipping system is configured to store, associated with the at least one autonomous compartments cluster, a unique cluster identification and broadcasting and sleep mode parameters including a repetition time period and a slow repetition time period and a slow sleep return delay. These broadcasting and sleep mode parameters correspond to optimized parameters for the locking module to communicate with the mobile device and for managing sleep modes of the locking module to minimize energy consumption.

In a particular embodiment, the mobile device comprises a SetConfig function configured for updating the broadcasting and sleep mode parameters of the parcel locker bank. As a parcel locker bank environment can evolve with time, the SetConfig function is most useful for updating the broadcasting and sleep mode parameters of the locking modules of the parcel locker bank in order to minimize energy consumption while maintaining an appropriate user experience.

One or more embodiment of the invention also concerns a method for minimizing the power consumption of a locking module, while maintaining an appropriate user experience, and for operating a parcel locker bank constituted of at least one autonomous compartments cluster including at least one compartment and including a locking module, via a mobile device wherein the locking module comprises an energy management module configured for managing transitions of energy states and allowing the locking module to be run in a very low energy state or in a low energy state and regularly allowing a wake-up from the very low energy state to the low energy state, wherein in said very low energy state said locking module cannot communicate with said mobile device and said locking module cannot be wakened up by said mobile device, the method comprising: receiving an active scan message from the mobile device, which is a quick response informing the locking module that the mobile device is actively scanning, switching from a slow sleep mode to a sleep mode, wherein once in sleep mode, the locking module is able to exchange more quickly with the mobile device allowing quicker scans results for the mobile device and therefore providing a better user experience than in slow sleep mode, starting a slow sleep timer for switching from the sleep mode back to the slow sleep mode, transitioning from the very low energy state to the low energy state when a repetition time period is reached by a broadcasting timer, broadcasting a second short message and actively listening to a response from the mobile device, capturing by the mobile device the broadcasted second short message and responding by specifically sending by the mobile device a connect message for establishing a communication session with the locking module, switching from the sleep mode to a full operation mode and establishing a communication session with the mobile device, wherein the locking module stops broadcasting short messages during the communication session, and stopping the slow sleep timer for switching from the sleep mode back to the slow sleep mode.

In a preferred embodiment, the method further comprises terminating the communication session by the mobile device, transitioning into the very low energy state and returning to the sleep mode, resetting and starting the slow sleep timer, and returning to the slow sleep mode when the slow sleep timer reaches a slow sleep return delay. Then the locking module remains in the lower energy consumption slow sleep mode as long as it does not receive an active scan message.

According to a feature of at least one embodiment of the invention, in preparation for establishing a communication session between the locking module and the mobile device, the method further comprises: reaching a slow repetition time period by the broadcasting timer, transitioning from the very low energy state to the low energy state, broadcasting a first short message and actively listening to a response from the mobile device, capturing the first broadcasted short message by the mobile device, and in response sending by the mobile device the active scan message.

Advantageously, the broadcasted first short message comprises a cluster identification, which uniquely identifies the at least one autonomous compartments cluster.

According to another feature of at least one embodiment of the invention, the active scan message is unicast response specifically sent to the locking module based on the cluster identification retrieved from the broadcasted first short message.

In another embodiment, the switching from the slow sleep mode to the sleep mode comprises: when receiving the active scan message, triggering a transition of the locking module into the full operation mode, replacing the slow repetition time period used by the broadcasting timer with the repetition time period, transitioning back into the very low energy state, restarting the broadcasting timer, and operating in the sleep mode. Depending on the parcel locker bank environment evolution, the broadcasting and sleep mode parameters of the locking modules of the parcel locker bank may have to be updated.

In a particular embodiment, the method further comprises the following acts for updating broadcasting and sleep mode parameters including the repetition time period and the slow repetition time period and the slow sleep return period: requesting a transfer of broadcasting and sleep mode parameters from the mobile device to the electronic locking module, validating the requesting a transfer for an authorized user located near the parcel locker bank, performing a scan of the parcel locker bank to find the compartments cluster needing broadcasting and sleep mode parameters, establishing a communication session between the mobile device and the locking module based on the cluster identification included in the broadcasted first short message, retrieving the broadcasting and sleep mode parameters from a configuration package stored in the mobile device, transferring the broadcasting and sleep mode parameters from the mobile device to the locking module, and storing the broadcasting and sleep mode parameters in the locking module. Thereafter, the locking module operates based on the new set of broadcasting and sleep mode parameters.

Preferably, the method further comprises the following acts for updating the broadcasting and sleep mode parameters: including the broadcasting and sleep mode parameters and the unique cluster identification in the configuration package associated with the locking module and downloading the configuration package onto the mobile device.

BRIEF DESCRIPTION OF THE DRAWINGS

Other aspects, features, and advantages of the teachings of the invention will become clearer to those ordinary skilled in the art upon review of the following description in conjunction with the accompanying drawings where.

DETAILED DESCRIPTION

Figure 1:
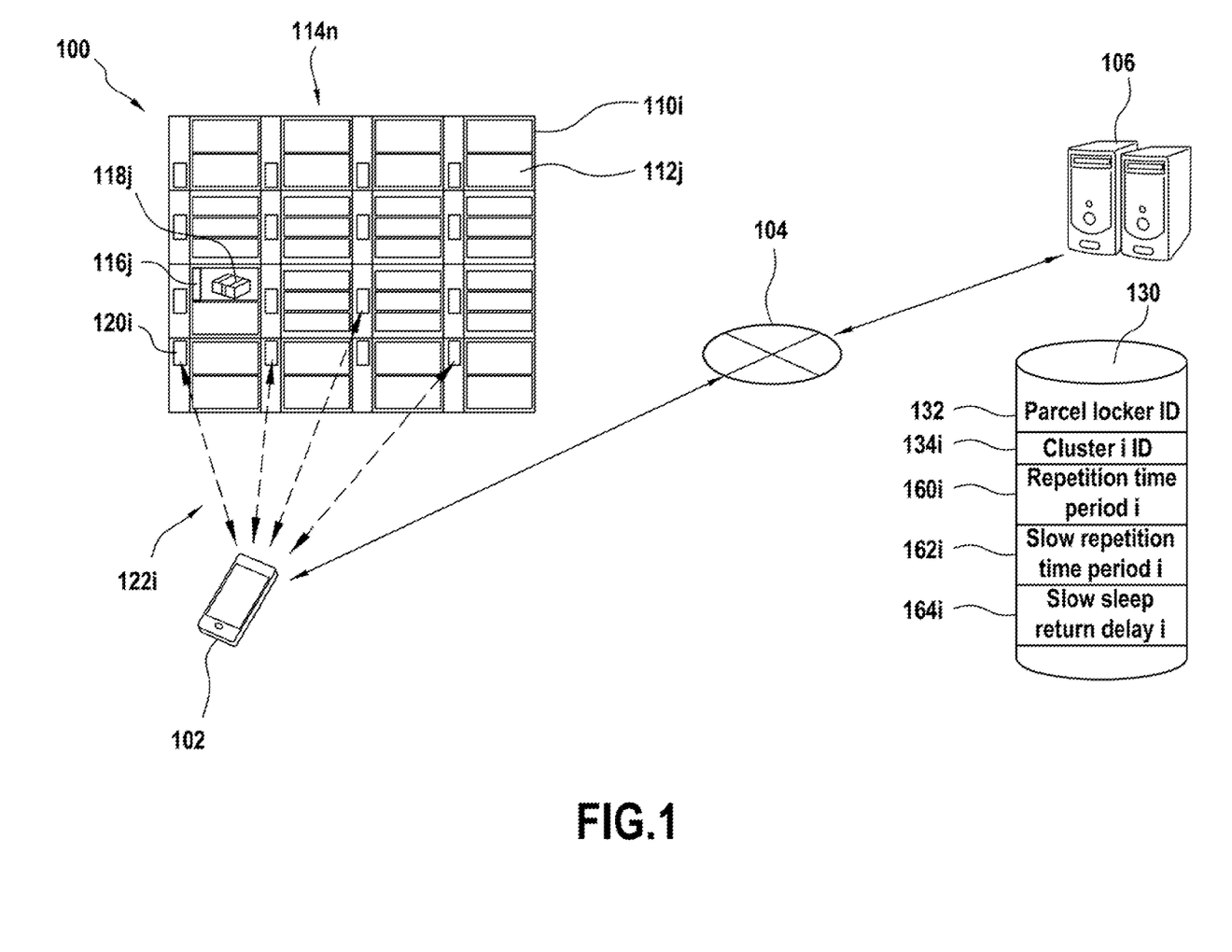
FIG. 1 illustrates an embodiment of a system for operating autonomous compartments clusters of at least one embodiment of the invention.

To avoid the necessity for power connection, autonomous compartments clusters interact locally with mobile devices via short-distance wireless communication. FIG. 1 illustrates an embodiment of a system for operating autonomous compartments clusters of at least one embodiment of the invention comprising a parcel locker bank 100, a mobile device 102 communicating via a long-distance communication network 104 based on a technology such as 3G-4G or GSM with a remote shipping system 106, which manages access authorization to the parcel locker bank and data regarding to the shipments handled by the parcel locker bank, as well as configuration data for operating the parcel locker bank. The mobile device 102 can be a smartphone or personal digital assistant (PDA) or any computerized mobile device having some short-distance communication capabilities compatible with the short-distance communication capabilities of the compartments clusters and having some long-distance communication capabilities compatible with the long-distance communication capabilities of the remote shipping system. The parcel locker bank 100 is constituted of autonomous compartments clusters 110$i$, which may comprise several compartments 112$j$. The compartment clusters can be piled up and mechanically fastened together to form a column 114. An autonomous compartments cluster is characterized by a design without any power connection or long-distance communication, allowing for simple installation and configuration upgrade and servicing. Each compartment 112$j$ is equipped on the front with a hinged door 116$j$, which when opened allows for depositing in the compartment or retrieving from the compartment a shipment 118$j$. Each autonomous compartments cluster 110$i$ comprises a communicating locking module 120$i$, which electronically controls the locking and unlocking of each door of the compartments of the cluster. Each locking module 120$i$ can establish a local communication with a nearby mobile device 102 via a short-distance communication 122$i$, such as WIFI, IR or Bluetooth.

The remote shipping system comprises a database system 130, which may include several databases eventually installed on several server systems operated by shipping carriers or by a service company owning or managing a parcel locker bank park. The database system 130 stores configurations of all the parcel locker banks 100 to be controlled by the remote shipping system. Each parcel locker bank configuration includes a unique parcel locker bank identification 132, and for each compartments cluster 110$i$ of the parcel locker bank, a unique cluster identification 134$i$. The PL configuration also comprises broadcasting and sleep mode parameters for each compartments cluster including a repetition time period 160$i$, a slow repetition time period 162$i$ and a slow sleep return delay 164$i$. As it will be detailed below, the broadcasting and sleep mode parameters correspond to optimized parameters for the locking module to communicate with mobile devices and for managing sleep modes of the locking module to minimize energy consumption.

Figure 2:
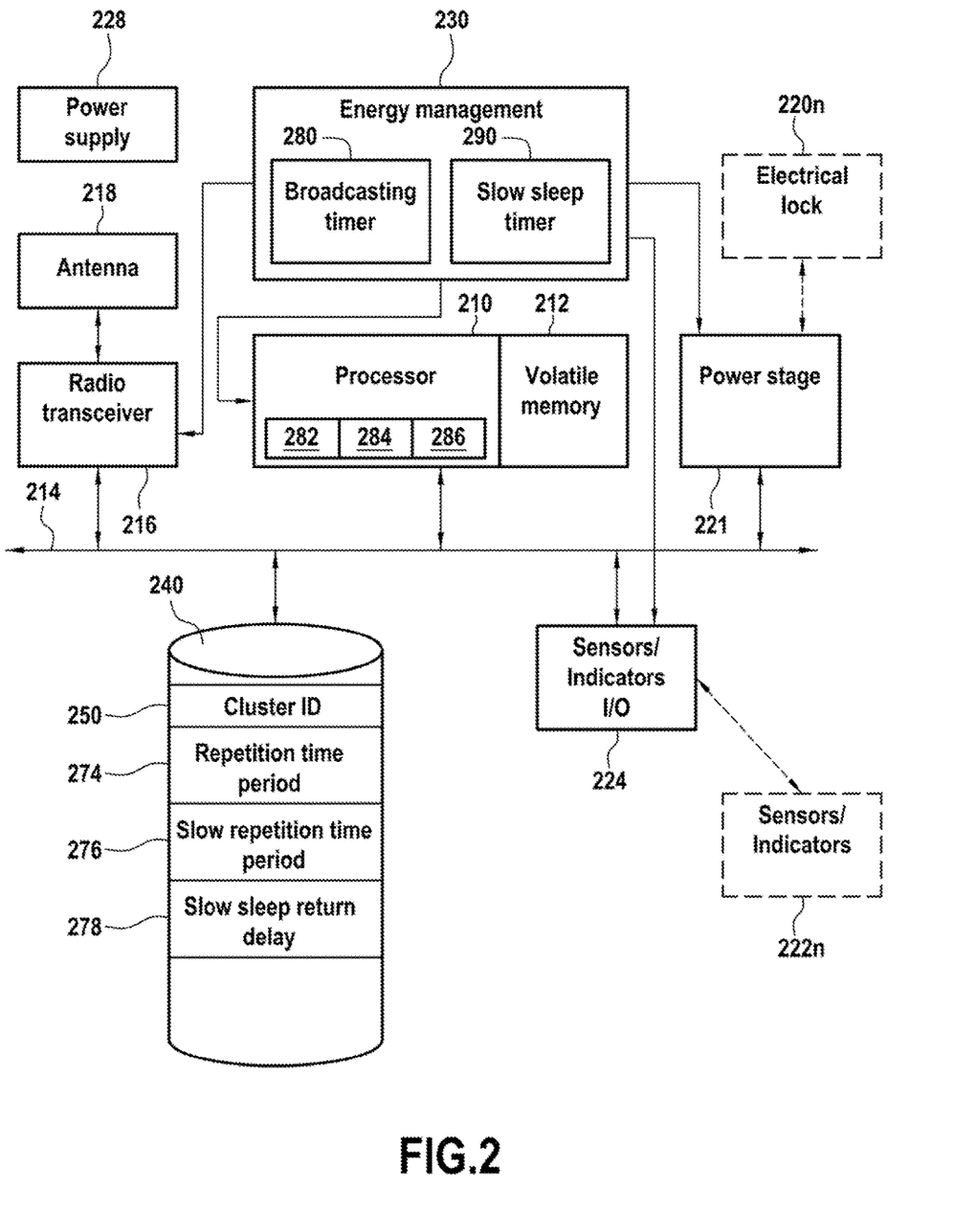
FIG. 2 shows an embodiment of a locking module of a compartments cluster of the at least one embodiment of invention.

FIG. 2 illustrates a locking module 120$i$ of a compartments cluster 110$i$, which comprises a processor or a group of processors 210 and associated volatile memory 212 controlling the major components of the locking module via a bus 214 or via direct control lines. The short-distance wireless communication is carried out by a radio transceiver module 216 equipped with an antenna or a group of antennas 218. The radio transceiver module may include some registers or may have access to dedicated registers within the locking module memories. These registers dedicated to the radio transceiver module include setting data for the operation of the radio transceiver module or the antenna and data relative to initial messages or broadcasting short messages sent by the locking module for initiating communication with a mobile device or several mobile devices. The door of each compartment of the compartments cluster is equipped with an electrical lock 220n. The door fastening of the electrical locks is performed via a power stage 221, which in particular provides the power for the electrical locks under the control of the processor 210, and is directly controlled by the processor 210. Sensors or indicators 222n may be provided for each compartment for establishing the status of the electrical lock (locked/unlocked) or the status of the door (opened/closed) or whether the compartment is empty or full. The powering of the sensors/indicators as well as the measurements performed by the sensors are provided via the sensors/indicators input/output ports (I/O) 224 of the locking module.

The locking module is powered by a power supply 228, which is typically constituted of replaceable batteries, but may also be rechargeable batteries via solar panels or energy harvesting equipment or any other electrical energy supplies. Each electrical or electronic component of the locking module is powered by the power supply (not represented on FIG. 2). To minimize the power consumption, an energy management module 230 manages transitions of energy consumption states and allows the compartments cluster 110i to be run in different energy states. Each energy state defines which peripheral or component is available and limits the amount of current consumed by the peripherals or components. For example, the energy management module may turn off or on the power of unused blocks of the volatile memory 212 or may turn off or on the radio transceiver module. The energy management module may comprise voltage regulators and timers for switching between energy states. A non-volatile memory 240 controlled and directly accessible by the processor stores the firmware run by the processor 210 and data received from the remote shipping server via mobile devices or generated within the compartments cluster 110i such as operation events. The data stored in the non-volatile memory 240 comprises a cluster identification 250, which uniquely identifies the compartments cluster, and broadcasting and sleep mode parameters used for the locking module to communicate with mobile devices and manage sleep modes to minimize energy consumption and including a repetition time period 274, a slow repetition time period 276 and a slow sleep return delay 278.

The non-volatile memory 240 can also store operational data such as functions, which are available for the compartments cluster operation and which can be run by the processor 210 on request by an authorized mobile device, or such as authorization codes, which may be requested from a recipient for his picking up of a shipment in the compartment, or events which have occurred during operations of the compartments' clusters. Typical events include change in the status of the door and new status (opened/closed) or change in the status of the lock and new status (locked/unlocked) or whether the compartment is dirtied or damaged or whether a shipment is deposited in the compartment. Events data is eventually transferred to the remote shipping system via a mobile device for the remote shipping system to monitor and manage the park of compartments clusters and of parcel locker banks.

When a compartments cluster is not in use, the locking module is in a very low energy state (or deep sleep state) so as to minimize the power consumption of the compartments cluster. Only limited functions are available, and the radio transceiver module in particular is asleep, and the locking module cannot communicate with and cannot be wakened up by a mobile device proximate to the compartments cluster. To allow for initiating a communication session with a mobile device, when in very low energy state, the locking module temporarily partially wakes-up for broadcasting a short message. This partial wake-up, corresponding to a low energy state (or sleep state), temporarily activates the radio transceiver module and can be controlled by the energy management module comprising a broadcasting timer 280 for triggering transitions to the low energy state from the very low energy state. In the low energy state, additional functionalities, compared to the very low energy state, are limited to sending a broadcasted short message and waiting for a response, which may eventually trigger an interrupt. The energy consumption ratio between the very low energy state and the low energy state is typically ten (10) to twenty (20). The power consumption level of the locking module in the very low energy state is in the range of 0.5 mW to 5 mW, while the power consumption level when the locking module is fully awake and fully operational can up to several thousands of milliwatts. The operation of the locking module can be controlled by a processor constituted of several processor modules comprising a high energy processor module 282, which is de-activated in the low energy state, controlling high level functionalities including the communication management, and the access authorization management and a low energy processor module 284, which is de-activated in the very low energy state, controlling the radio transceiver module for sending a broadcasted short message and waiting for a response, and a very low energy processor module 286 for minimal control. The operation of the locking module also can be controlled by separate processors cooperating and whose activity and energy consumption are managed by the energy management module. For example, a particular processor may control the radio transceiver module and may be specifically awakened during the low energy state.

To minimize power consumption, the locking module is generally maintained in a very low energy state. For allowing communication with a mobile device, the broadcasting timer 280 regularly triggers a transition from very low energy state to a low energy state according to a repetition time period. Once in low energy state, the locking module sends a broadcasted short message and actively listens to a response from a mobile device. A mobile device proximate to the compartments cluster and whose short-distance communication is activated, has a scanning function for listening to broadcasted short messages from locking modules. The mobile device can then respond to the locking module and further communication can be established with a following broadcasted short message from the locking module. The locking module is configured for operating in this energy saving mode, called sleep mode, where the locking module regularly performs a partial wake-up switching from a very low energy state to a low energy state based on the repetition time period. Then, the locking module returns to the very low energy state unless it is requested to switch into full operation mode associated with an energy run state where all functionalities of the locking module are available, including in particular performing access authorization processes and establishing communication sessions with mobile devices.

When a carrier agent arrives near the parcel locker bank with autonomous lockable compartments for collecting shipments, which have not been picked up in due time by recipients, and/or for depositing shipments to be picked-up by recipients, his mobile device needs to scan and to exchange with the locking modules, and eventually establish communications with the locking modules. Such process cannot take too long to not delay the carrier agent's task. Therefore, the need for scanning locking modules of parcel locker banks with autonomous lockable compartments and for establishing communication sessions quickly enough as to not negatively impact user experience, requires a short enough repetition time period. Fulfilling the user experience with a short enough repetition time period, drives up a resulting power consumption of the locking modules. A main embodiment of the invention is to introduce a new slow sleep mode associated with a slow repetition time period, i.e., a longer repetition time period. To minimize the power consumption of the locking module, the locking module is configured for operating by default in slow sleep mode. In slow sleep mode, the broadcasting timer 280 regularly triggers a transition from very low energy state to low energy state based on the slow repetition time period. When the mobile device captures a broadcasted short message from a locking module, the scanning function sends an active scan message, which is a quick response informing the locking module that a mobile device is actively scanning. This active scan message is a generic message, which may be automatically sent by the scanning function of any mobile device proximate to the parcel locker bank in response to receiving a broadcasted short message. The locking module is configured to react to the active scan message by switching from the slow sleep mode to the sleep mode, therefore fulfilling the user experience. For a standard parcel locker bank configuration with 20 compartments clusters, the optimized repetition time period is in the range 150 ms to 250 ms with a preferred value of 200 ms and the optimized low repetition time period is in the range 400 ms to 1000 ms with a preferred value of 500 ms. Depending on the parcel locker bank configuration and on the parcel locker bank environment, as discussed later, the repetition time period and the low repetition time period can be adjusted for optimizing energy saving of each parcel locker bank.

In a preferred embodiment of the invention, the broadcasted short message prepared by the processor includes the unique cluster identification 250 copied from the memory 240. Based on this unique cluster identification, the mobile device can specifically address the active scan message to the locker module. The active scan message from the mobile device is received by the radio transceiver module and transferred to the processor. This can be performed by a pre-set service subscription for active scan messages received by the radio transceiver to be transferred to the processor. When receiving the active scan message, the processor triggers a temporary full wake-up of the locking module transitioning in an energy run state (full operation) and allowing the locking module to switch from the slow sleep mode to the sleep mode. The energy management module 230 activates the processor high level functionalities by activating the high energy processor module controlling high level functionalities or by activating the corresponding processor in case of an architecture with separate processors cooperating together. The processor replaces the slow repetition time period used by the broadcasting timer with the repetition time period copied from the memory 240. Then the locking module transitions back in low energy state and operates in sleep mode with the broadcasting timer of the energy management module using the repetition time period. Once in sleep mode, the locking module is able to exchange more quickly with the mobile device allowing quicker scans results for the mobile device and therefore providing a better user experience than in slow sleep mode.

According to at least one embodiment of the invention, the switching from the slow sleep mode to the sleep mode is performed after receiving a generic active scan message from a mobile device proximate to the parcel locker bank. Following on this switching, the locking module may perform an access authorization process based on the user credentials provided by the mobile device. After a successful access authorization process, a communication session with the mobile device may be established. However, the switching from the slow sleep mode to the sleep mode occurs before an access authorization process and before the locking module establishing a communication session with a mobile device. This switching from the slow sleep mode to the sleep mode does not need an access authorization process or the establishment of a communication session to occur.

To limit the energy consumption associated with the sleep mode, the energy management module comprises a slow sleep timer 290 for switching from the sleep mode back to the slow sleep mode. The slow sleep timer is started by the processor, preferably while the locking module is in full operation mode before transitioning back into low energy state. As part of the energy management module, the slow sleep timer can run while the locking module is in a very low energy state for a duration defined by the slow sleep return delay stored in the memory 240. Once the slow sleep return delay is reached, the locking module switches back from the sleep mode to the slow sleep mode. Then the locking module remains in the lower energy consumption slow sleep mode as long as it does not receive an active scan message. Preferably, the slow sleep return delay corresponds to the maximum time needed for a carrier agent to collect shipments from and deposit shipments into parcel locker bank so that the locking modules of the parcel locker bank do not return to slow sleep mode before the carrier agent has finished interacting with the parcel locker bank.

One advantage of at least one embodiment of the invention is that any mobile device, whose short-distance communication and scan mode are activated, can trigger the switch from slow sleep mode to sleep mode of the locking modules of a parcel locker bank when the mobile device is moved next to the parcel locker bank. Such triggering would occur in very frequented locations where people are carrying mobile devices, and in particular smartphones, such as in office buildings, in malls, on retailer's premises, train or subway station, or frequented shops, which are typical locations for parcel locker banks. Users of parcel locker banks of at least one embodiment of the invention can benefit from such a triggering occurring before they arrive for using the parcel locker bank as the locking modules being in sleep mode rather than slow sleep mode allows for faster scans and exchanges of their mobile device with the locking modules.

Depending on the parcel locker bank environment, the parcel locker bank users' behavior and the frequentation of the location by persons carrying mobile devices, the broadcasting and sleep mode parameters of the locking modules of the parcel locker bank can be adjusted and optimized for minimizing energy consumption while maintaining an appropriate user experience. For example, the slow repetition time period can be set at a much higher value in very frequented locations where people are carrying mobile devices compared to locations with low frequentation and/or low usage of mobile devices. Another example is a location with several parcel locker banks. If it can be established that carrier agents always begin their collection and deposit with one of the parcel locker banks, then the slow repetition time period for the other parcel locker banks can be set at a much higher value than the slow repetition time period for that particular parcel locker bank.

The system of at least one embodiment of the invention for operating autonomous compartments clusters of compartments embodied by FIG. 1 provides the capability to update the broadcasting and sleep mode parameters of a locking module. For each autonomous compartments cluster, the remote shipping system 106 stores in the database 130 a set of broadcasting and sleep mode parameters associated with the unique cluster identification 134$i$ of the autonomous compartments cluster. The set of broadcasting and sleep mode parameters includes the repetition time period 160$i$, the slow repetition time period 162$i$ and the slow sleep return delay 164$i$ for the autonomous compartments cluster. The broadcasting and sleep mode parameters can be included in a configuration package associated with the autonomous compartments cluster. The configuration package includes parameters defined for an optimal operation of the compartments cluster. Eventually, the configuration package may be the same for all the compartments clusters of a parcel locker bank. Preferably, a configuration package can be automatically prepared by the remote shipping server for each parcel locker bank controlled by the remote shipping system. When required, the configuration package of the autonomous compartments cluster can be downloaded onto a mobile device, which is due to interact with the parcel locker bank. Such download is used for the initial installation of a parcel locker bank when the broadcasting and sleep mode parameters need to be set-up in each locking module of the parcel locker bank or during any swap of an autonomous compartments cluster. Such download is also used when the firmware of a locking module is updated or anytime the broadcasting and sleep mode parameters need to be updated.

For locally operating the parcel locker bank compartments, the mobile device of carrier agents or site owners are provided with a mobile parcel locker bank application which may be installed on their mobile devices. In the case of a carrier agent PDA, the MPL application may be integrated in a carrier agent software module installed on his PDA for delivering shipments. The mobile parcel locker bank application incudes a SetConfig function for updating the broadcasting and sleep mode parameters of parcel locker banks. The SetConfig function is used for the initial installation of a parcel locker bank or during any swap of an autonomous compartments cluster. Once a communication session has been established between the mobile device and a compartments cluster, the SetConfig function is configured for retrieving the broadcasting and sleep mode parameters including a repetition time period, a slow repetition time period and a slow sleep return delay corresponding to the locking module of the compartments cluster from the configuration package. The SetConfig function is configured for authorized users for transferring the broadcasting and sleep mode parameters to the locking module so that they can be stored in the memory 240 and in particular for setting or updating the repetition time period 274, the slow repetition time period 276 and the slow sleep return delay 278. For a complete update of the broadcasting and sleep mode parameters of a parcel locker bank, the mobile device needs to establish a communication session with each compartments cluster of the parcel locker bank and perform a SetConfig. For complex parcel locker bank configurations or more difficult environment, each compartments cluster may have a specific set of broadcasting and sleep mode parameters. For simpler situations, the broadcasting and sleep mode parameters may be similar for all the compartments cluster of the parcel locker bank.

This SetConfig function is most useful for updating broadcasting and sleep mode parameters as a parcel locker bank environment can evolve with time and the knowledge regarding the parcel locker bank environment can evolve with time. To update and optimize locking modules of the parcel locker bank for minimizing energy consumption while maintaining an appropriate user experience, the slow repetition time period 276 is the preferred parameter.

Figure 3:
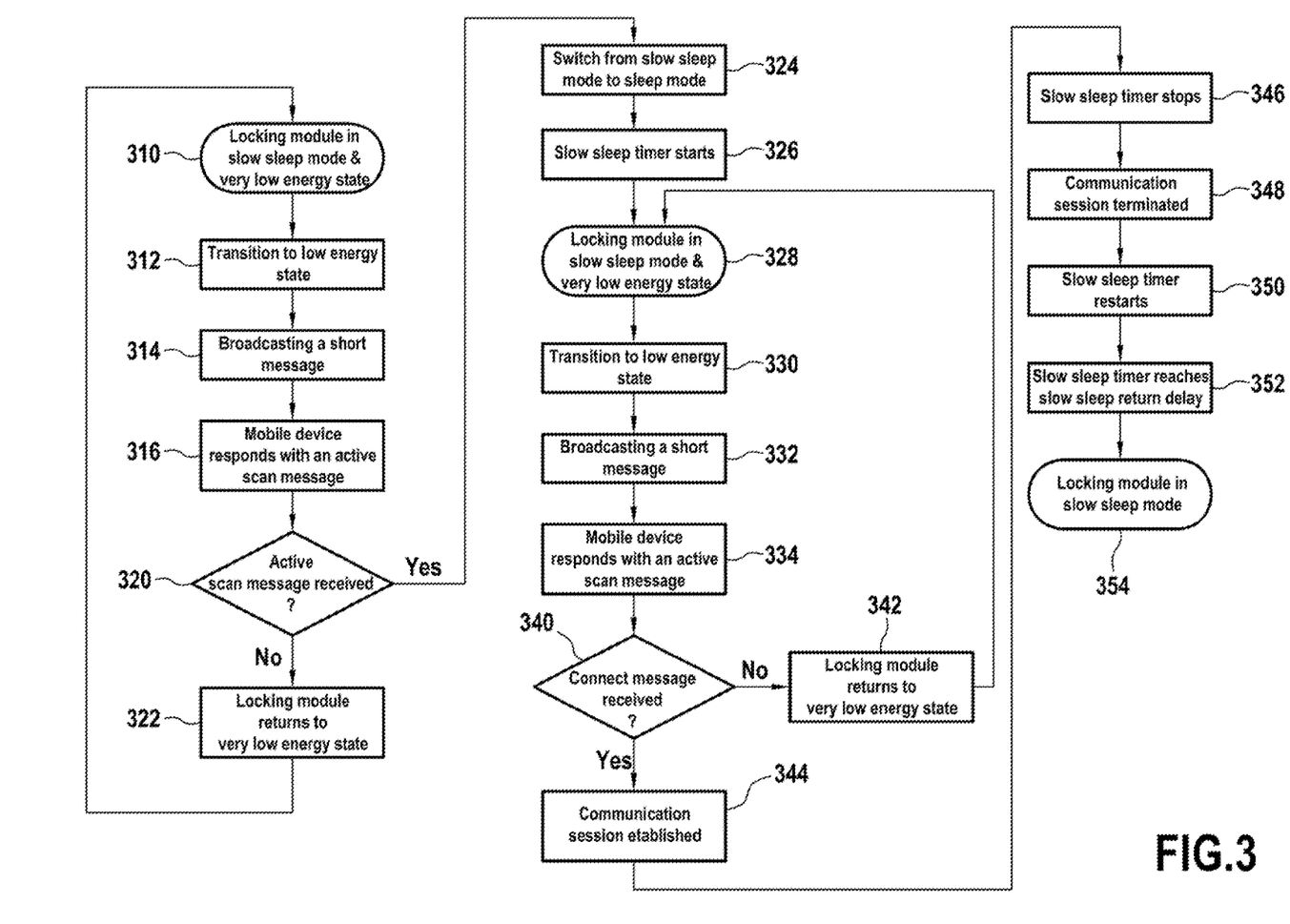
FIG. 3 represents a flow diagram of a method of at least one embodiment of the present invention for minimizing the power consumption of a locking module.

A method for minimizing the power consumption of a locking module according to at least one embodiment of the invention, while maintaining an appropriate user experience, is now described in reference to FIG. 3. In act 310, a locking module 120$i$ of a compartments cluster 110$i$ is in a very low energy state, and in slow sleep mode, which is the mode by default and is generally the case when a compartments cluster is not in use. The broadcasting timer 280 for triggering transitions to the low energy state is running. A person carrying a mobile device, whose short-distance communication and scan mode are activated, has arrived near the parcel locker bank. This person may be a user of the parcel locker bank such as a carrier agent or a site owner or a shipment recipient, but is more likely to be any smartphone carrier, especially in frequented locations, such as in office buildings, in malls, on retailer's premises, train or subway station, or frequented shops, which are typical locations for parcel locker banks. In the case of a carrier agent or a site owner, the short-distance communication and/or of the scan mode may be activated via the mobile parcel locker bank application running on his mobile device either automatically or manually, for example by launching a scanning function of the parcel locker bank with the user interface of the mobile parcel locker bank application. In act 312, the broadcasting timer reaches the slow repetition time period 276 stored in the memory 240. The locking module is transitioned from the very low energy state to the low energy state.

This partial wake-up activates the radio transceiver module 216 and can be controlled by the energy management module 230. In act 314, the locking module, partially waken-up, broadcasts a short message for allowing a communication session with a mobile device and actively listens to a response from a mobile device. The broadcasted short message comprises a cluster identification retrieved from the data 250 stored in the non-volatile memory 240, which uniquely identifies the compartments cluster. In act 316, the mobile device with the scan mode activated, proximate to the compartments cluster, captures the broadcasted short message and responds to the locking module by sending an active scan message, which is a quick response informing the locking module that a mobile device is actively scanning. This active scan message is a generic message, which may be automatically sent by any mobile device proximate to the parcel locker bank in response to receiving a broadcasted short message. Preferably, the mobile device responds specifically to the locking module (unicast response) based on the cluster identification retrieved from the broadcasted short message.

If the active scan message is not received in due time by the locking module in act 320, for example because of a delayed response from the mobile device, the locking module returns to the very low energy state in act 322 and remains in slow sleep mode returning to act 310. If the active scan message is received by the locking module in act 320 via the radio transceiver, in act 324 the locking module switches from the slow sleep mode to the sleep mode. Preferably the switch is performed as follows: the active scan message is transferred from the radio transceiver module to the processor, and when receiving the active scan message, the processor triggers a transition of the locking module into full operation mode. The slow repetition time period used by the broadcasting timer is replaced with the repetition time period 274 stored in the memory 240. The locking module transitions back into very low energy state. The broadcasting timer is restarted, and the locking module operates in sleep mode. Once in sleep mode, the locking module is able to exchange more quickly with the mobile device allowing quicker scans results for the mobile device and therefore providing a better user experience than in slow sleep mode. In act 326, the slow sleep timer 290 starts running. Preferably, the slow sleep timer is started while the locking module is in full operation mode before transitioning back into very low energy state. In act 328, a locking module is in a very low energy state and operates in sleep mode. The broadcasting timer 280 for triggering transitions to the low energy state is running. In act 330, the locking module is transitioned from the very low energy state to the low energy state when the broadcasting timer reaches the repetition time period. In act 332, the locking module broadcasts a short message comprising the cluster identification and actively listens to a response from the mobile device. In act 334, the mobile device captures the broadcasted short message and responds to the locking module by specifically sending to the locking module (unicast response based on the cluster identification) a connect message for establishing a communication session with the locking module. The connect message includes user credentials, which are used by the locking module for authorizing the establishment of a communication session during an access authorization process. According to at least one embodiment of the invention, the switching from the slow sleep mode to the sleep mode is performed after receiving a generic active scan message from a mobile device proximate to the parcel locker bank. This switching occurs before an access authorization process and before the locking module establishing a communication session with a mobile device. This switching from the slow sleep mode to the sleep mode does not need an access authorization process or the establishment of a communication session to occur.

If the connect message is not received in due time by the locking module in act 340, for example because of a delayed response from the mobile device, the locking module transitions into very low energy state in act 342 and remains in the sleep mode returning to act 328. If the connect message is received by the locking module in act 340, in act 344 the locking module switches from sleep mode to full operation mode and performs the access authorization process for authorizing the establishment of a communication session with the mobile device based on the user credentials included in the connect message. After a successful access authorization process, the locking module establishes a communication session with the mobile device. The locking module stops broadcasting short messages during the communication session. Preferably, the mobile device stops scanning locking modules of the parcel locker bank. In act 346, the slow sleep timer stops as long as the locking module is in full operation mode. In act 348, once all interactions with the locking module is completed, the mobile device terminates the communication session by sending a disconnect message to the locking module. The locker module transitions into very low energy state and returns to the sleep mode. In act 350, the slow sleep timer is reset and starts running. In act 352, if the locking module has not received any response to its broadcasted short messages, the slow sleep timer reaches the low sleep return delay, and the locking module returns to the slow sleep mode. Otherwise, if the locking module has received a response to a broadcasted short message, preferably the slow sleep timer is reset, and eventually, depending on the response of the mobile device, the locking module may switch to full operation mode and eventually establish a communication session with the mobile device (not represented on FIG. 3). Such a succession of communication sessions could occur, for example, when a carrier agent performs a collection of a shipment in a particular compartments cluster and then, after completing the collection from all compartments' clusters, performs a deposit into this particular compartments' cluster. In act 354, the locking module remains in the lower energy consumption slow sleep mode as long as it does not receive an active scan message. The locking module while into the loop of acts 328 to 342, may have returned from the sleep mode to the slow sleep mode before any communication session may have been established the slow sleep timer reaches the low sleep return delay (not represented on FIG. 3). Such return could occur, for example, following on a passage of a person carrying a mobile device, whose short-distance communication and scan mode are activated, for a parcel locker bank installed in a less frequented location.

When a carrier agent must perform a collection and/or deposit of shipments from/in a parcel locker bank, his mobile device must scan and eventually exchange with all the locking modules of the parcel locker bank. One major advantage of the method of at least one embodiment of the invention described above is that any mobile device, whose short-distance communication and scan mode are activated, can trigger a switch from slow sleep mode to sleep mode of the locking modules of the parcel locker bank when the mobile device is moved next to the parcel locker bank. As a result, when a carrier agent arrives near the parcel locker bank, the locking modules are already in sleep mode and the scan of the parcel locker bank can be performed more rapidly than if the locking modules were still in slow sleep mode. A shipper using the parcel locker bank for shipping an item also benefits of the same advantage as his mobile device needs to scan the parcel locker bank to establish the most appropriate compartment for his deposit.

Figure 4:
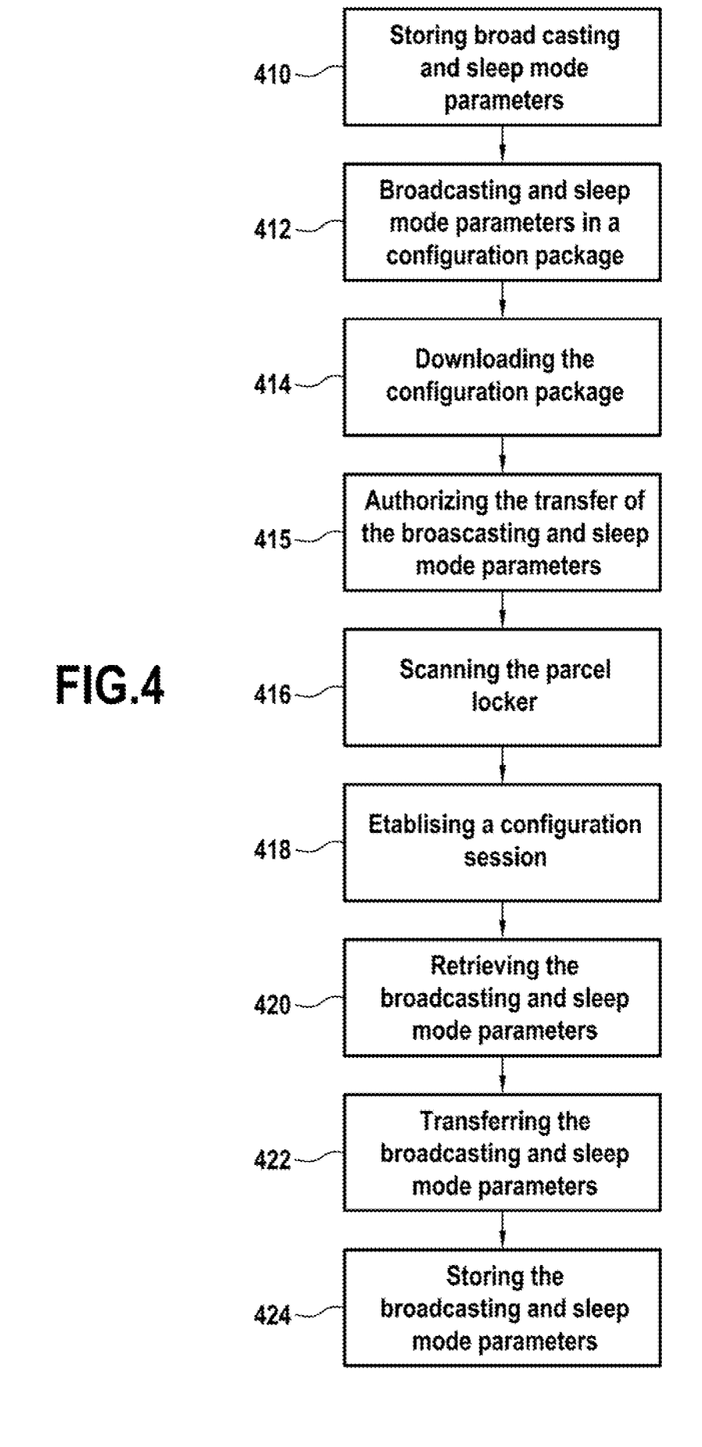
FIG. 4 illustrates a process of at least one embodiment of the invention for updating broadcasting and sleep mode parameters of a locking module.

A method for updating the broadcasting and sleep mode parameters of a locking module of a parcel locker bank constituted of autonomous compartments clusters according to at least one embodiment of the invention is now described in reference to FIG. 4. In act 410, a set of broadcasting and sleep mode parameters associated with a unique cluster identification of a compartments cluster is stored, for each compartments cluster of the parcel locker bank, in the database 130 of the remote shipping system 106. The set of broadcasting and sleep mode parameters includes the repetition time period 160*i*, the slow repetition time period 162*i* and the slow sleep return delay 164*i* for the compartments cluster. In act 412, the broadcasting and sleep mode parameters and the unique cluster identification are included in a configuration package associated with the compartments cluster. Preferably, the configuration package is prepared by the remote shipping server. In act 414, the configuration package of a parcel locker bank is downloaded onto a mobile device, which is due to interact with the parcel locker bank.

In act 415, the transfer of the broadcasting and sleep mode parameters from the mobile device to the locking module is requested via the mobile device and the request is validated for an authorized user located near the parcel locker bank. In act 416, the mobile device performs a scan of the parcel locker bank to find the compartments cluster, which needs to receive the broadcasting and sleep mode parameters based on the unique cluster identification comprised in the configuration package. This can be required for setting the parameters during the initial installation or during a swap of the compartments cluster, or for updating the parameters for example due to evolution of the parcel locker bank environment or of the knowledge regarding the parcel locker bank environment. In act 418, the mobile device establishes a communication session with the compartments cluster based on the cluster identification 250 copied from the memory 240 of the compartments cluster and included in the broadcasted short message sent by the compartments cluster and received by the mobile device. In act 420, the broadcasting and sleep mode parameters are retrieved from the configuration package stored in the mobile device and are made available to be transferred from the mobile device to the compartments cluster. In act 422, the broadcasting and sleep mode parameters are transferred from the mobile device to the locking module of the compartments cluster. In act 424, the broadcasting and sleep mode parameters are stored in the locking module, and the locking module operates thereafter based on the new set of broadcasting and sleep mode parameters. For a complete update of the broadcasting and sleep mode parameters of the parcel locker bank, the acts 415 to 424 are repeated for all the compartments clusters of the parcel locker bank.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. The present subject matter may be implemented, in whole or in part, in integrated circuits, as one or more sets of executable instructions (e.g., computer programs) running on one or more computers (e.g., as one or more programs running on one or more computer systems), as one or more sets of executable instructions (e.g., computer programs) running on one or more controllers (e.g., microcontrollers), as one or more sets of executable instructions (e.g., computer programs) running on one or more processors (e.g., microprocessors), as firmware executing via one or more Application Specific Integrated Circuits (ASICs) or Field Programmable Gate Arrays (FPGAs), or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of physical signal bearing media used to actually carry out the distribution. Examples of signal bearing media include, but are not limited to, the following: recordable type media such as floppy disks, hard disk drives, CD ROMs, digital tape, and computer memory.

European Patent Application No. 22 306 614.3, filed Oct. 25, 2022, to which the present application claims priority, is hereby incorporated herein by reference in its entirety.

The various embodiments described above can be combined to provide further embodiments. Aspects of the embodiments can be modified, if necessary, to employ systems, circuits and concepts of the various patents, applications and publications identified herein to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A locker system for parcel deposit and pick-up, comprising:
   a parcel locker bank constituted of at least one autonomous compartments cluster including at least one compartment equipped with a door and including a locking module, which electronically controls locking and unlocking of said door, and
   a mobile device configured to establish a local communication with said locking module via a short-distance communication,
   wherein said locking module comprises:
   an energy management module that manages transitions of energy states and allows said at least one autonomous compartments cluster to be run in a very low energy state or in a low energy state and regularly allows a partial wake-up from said very low energy state to said low energy state, wherein in said very low energy state said locking module cannot communicate with said mobile device and said locking module cannot be wakened up by said mobile device,
   a broadcasting timer that triggers a transition from a very low energy state to a low energy state,
   a radio transceiver module equipped with an antenna, and
   at least one processor running a firmware that, while in said very low energy state or in said low energy state, regularly emits via said radio transceiver module a broadcasted short message towards said at least one mobile device,
   wherein said locking module switches from a slow sleep mode associated with a slow repetition time period to a sleep mode associated with a repetition time period, which is shorter than said slow repetition time period, the slow repetition time period and the repetition time period specifying respective time periods at which messages are broadcasted in respective ones of the slow sleep mode and the sleep mode.

2. The locker system according to claim 1, wherein said mobile device is configured to send an active scan message when capturing said broadcasted short message and said switching from a slow sleep mode to a sleep mode is a response to said active scan message.

3. The locker system according to claim 1, wherein said locking module further comprises a non-volatile memory storing a unique cluster identification for identifying said compartments cluster, and broadcasting and sleep mode parameters including said slow repetition time period, said repetition time period and a slow sleep return delay.

4. The locker system according to claim 1, wherein said locking module replaces said slow repetition time period used by said broadcasting timer with said repetition time period copied from a non-volatile memory and transitions back in said low energy state and operates in said sleep mode with said broadcasting timer using said repetition time period to allow said switching from a slow sleep mode to a sleep mode.

5. The locker system according to claim 1, wherein said locking module comprises a slow sleep timer that switches from the sleep mode back to the slow sleep mode and said slow sleep timer runs while said locking module is in said very low energy state for a duration defined by a slow sleep return delay stored in a non-volatile memory.

6. The locker system according to claim 5, wherein said slow sleep return delay corresponds to a maximum time needed for a carrier agent to collect shipments from and deposit shipments into said parcel locker bank so that said locking module does not return to said slow sleep mode before said carrier agent has had sufficient time to finish interacting with said parcel locker bank.

7. The locker system according to claim 3, wherein said broadcasted short message includes a copy of said unique cluster identification, and in that said mobile device is configured to specifically address an active scan message to said locker module based on said copy of said unique cluster identification.

8. The locker system according to claim 1, wherein said at least one processor comprises a high energy processor module that is de-activated in said low energy state, and a low energy processor module that is de-activated in said very low energy state and which controls said radio transceiver module to send said broadcasted short message and wait for a response from said mobile device, and a very low energy processor module operable for minimal control.

9. The locker system according to claim 1 further operable with a long-distance communication network and further comprising a remote shipping system that communicates with said mobile device via said long-distance communication network wherein said remote shipping system stores, associated with said at least one autonomous compartments cluster, a unique cluster identification and broadcasting and sleep mode parameters including a repetition time period and a slow repetition time period and a slow sleep return delay.

10. The locker system according to claim 3, wherein said mobile device comprises a SetConfig function to update said broadcasting and sleep mode parameters of said parcel locker bank.

11. A method for operating a parcel locker bank constituted of at least one autonomous compartments cluster including at least one compartment and including a locking module, via a mobile device wherein said locking module comprises an energy management module configured for managing transitions of energy states and allowing said locking module to be run in a very low energy state or in a low energy state and regularly allowing a wake-up from said very low energy state to said low energy state, wherein in said very low energy state said locking module cannot communicate with said mobile device and said locking module cannot be wakened up by said mobile device, the method comprising:
receiving an active scan message from said mobile device, which is a quick response informing said locking module that said mobile device is actively scanning,
switching from a slow sleep mode to a sleep mode, the slow sleep mode associated with a slow repetition time period, the sleep mode associated with a repetition time period, which is shorter than the slow repetition time period, the slow repetition time period and the repetition time period specifying respective time periods at which messages are broadcasted in respective ones of the slow sleep mode and the sleep mode,
starting a slow sleep timer for switching from said sleep mode back to said slow sleep mode,
transitioning from said very low energy state to said low energy state when a repetition time period is reached by a broadcasting timer,
broadcasting a second short message and actively listening to a response from said mobile device,
capturing by said mobile device said broadcasted second short message and responding by specifically sending by said mobile device a connect message for establishing a communication session with said locking module,
switching from said sleep mode to a full operation mode and establishing a communication session with said mobile device, and
stopping the slow sleep timer for switching from said sleep mode back to said slow sleep mode.

12. The method according to claim 11, further comprising:
terminating said communication session by said mobile device,
transitioning into said very low energy state and returning to said sleep mode,
resetting and starting said slow sleep timer, and
returning to said slow sleep mode when said slow sleep timer reaches a slow sleep return delay.

13. The method according to claim 11, further comprising:
reaching a slow repetition time period by said broadcasting timer,
transitioning from said very low energy state to said low energy state,
broadcasting a first short message and actively listening to a response from said mobile device,
capturing said first broadcasted short message by said mobile device, and
in response sending by said mobile device said active scan message.

14. The method according to claim 13, wherein said broadcasted first short message comprises a cluster identification, which uniquely identifies said at least one autonomous compartments cluster.

15. The method according to claim 14, wherein said active scan message is unicast response specifically sent to said locking module based on said cluster identification retrieved from said broadcasted first short message.

16. The method according to claim 13, wherein said switching from said slow sleep mode to said sleep mode comprises:
when receiving said active scan message, triggering a transition of said locking module into said full operation mode,
replacing said slow repetition time period used by said broadcasting timer with said repetition time period,
transitioning back into said very low energy state,
restarting said broadcasting timer, and
operating in said sleep mode.

17. The method according to claim 13, further comprising for updating broadcasting and sleep mode parameters including said repetition time period and said slow repetition time period and a slow sleep return period:
  requesting a transfer of broadcasting and sleep mode parameters from said mobile device to an electronic locking module,
  validating said requesting a transfer for an authorized user located near said parcel locker bank,
  performing a scan of said parcel locker bank,
  establishing a communication session between said mobile device and said locking module based on a cluster identification included in said broadcasted first short message,
  retrieving said broadcasting and sleep mode parameters from a configuration package stored in said mobile device,
  transferring said broadcasting and sleep mode parameters from said mobile device to said locking module, and
  storing said broadcasting and sleep mode parameters in said locking module.

18. The method according to claim 17, further comprising for updating said broadcasting and sleep mode parameters:
  including said broadcasting and sleep mode parameters and a unique cluster identification in said configuration package associated with said locking module, and
  downloading said configuration package onto said mobile device.

\* \* \* \* \*